United States Patent
Katsurao et al.

(10) Patent No.: US 7,947,790 B2
(45) Date of Patent: May 24, 2011

(54) POROUS FILM OF VINYLIDENE FLUORIDE RESIN AND METHOD FOR PRODUCING SAME

(75) Inventors: Takumi Katsurao, Fukushima-Ken (JP); Tomoaki Kawakami, Chiba-Ken (JP); Toshio Hosokawa, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 821 days.

(21) Appl. No.: 10/553,442

(22) PCT Filed: Apr. 9, 2004

(86) PCT No.: PCT/JP2004/005149
§ 371 (c)(1),
(2), (4) Date: Feb. 3, 2006

(87) PCT Pub. No.: WO2004/092257
PCT Pub. Date: Oct. 28, 2004

(65) Prior Publication Data
US 2006/0148912 A1 Jul. 6, 2006

(30) Foreign Application Priority Data
Apr. 16, 2003 (JP) ................................ 2003-112013

(51) Int. Cl.
- *C08F 12/20* (2006.01)
- *C08F 14/18* (2006.01)
- *C08F 24/00* (2006.01)
- *C08F 20/00* (2006.01)
- *C08F 18/24* (2006.01)
- *C08F 20/06* (2006.01)
- *C08F 118/02* (2006.01)

(52) U.S. Cl. ..... 526/242; 526/255; 526/319; 526/317.1; 526/266; 526/303.1; 526/314

(58) Field of Classification Search ............... 526/242, 526/255, 319, 317.1, 266, 303.1, 314
See application file for complete search history.

(56) References Cited

U.S. PATENT DOCUMENTS

| | | | | |
|---|---|---|---|---|
| 4,618,533 A * | 10/1986 | Steuck | ........ | 428/315.7 |
| 4,855,163 A * | 8/1989 | Joffee et al. | .......... | 427/244 |
| 5,066,401 A * | 11/1991 | Muller et al. | ........ | 210/500.35 |
| 5,514,461 A | 5/1996 | Meguro et al. | | |
| 5,776,637 A * | 7/1998 | Kashio et al. | ........... | 429/217 |
| 6,299,773 B1 * | 10/2001 | Takamura et al. | ...... | 210/500.23 |
| 6,327,136 B1 * | 12/2001 | Meguro et al. | ........... | 361/502 |
| 2002/0144944 A1 | 10/2002 | Arcella et al. | | |

FOREIGN PATENT DOCUMENTS

| | | |
|---|---|---|
| FR | 2 620 712 | 3/1989 |
| JP | 1-144409 | 6/1989 |
| JP | 7-173323 | 7/1995 |
| JP | 10-168218 | 6/1998 |
| JP | 11-152366 | 6/1999 |
| JP | 2002-331232 | 11/2002 |

OTHER PUBLICATIONS

Communication pursuant to Article 94(3) EPC dated May 19, 2009 issued in connection with European Application No. 04 726 807.3 corresponding to present U.S. application.

* cited by examiner

*Primary Examiner* — William K Cheung
(74) *Attorney, Agent, or Firm* — Wenderoth, Lind & Ponack L.L.P.

(57) ABSTRACT

A porous membrane of vinylidene fluoride resin excellent in hydrophilicity and having a good balance among strength, elongation and water permeation rate, which is thus useful as a microfiltration membrane or a separator of battery. The porous membrane is formed from a copolymer of 100 mols of a vinylidene fluoride monomer and 0.01-10.0 mols of a hydrophilic monomer having at least one species of hydrophilic group selected from epoxy group, hydroxy group, carboxy group, ester group, amide group and acid anhydride group.

12 Claims, 4 Drawing Sheets

POROUS FILM OF VINYLIDENE FLUORIDE RESIN AND METHOD FOR PRODUCING SAME

TECHNICAL FIELD

Figure 1:
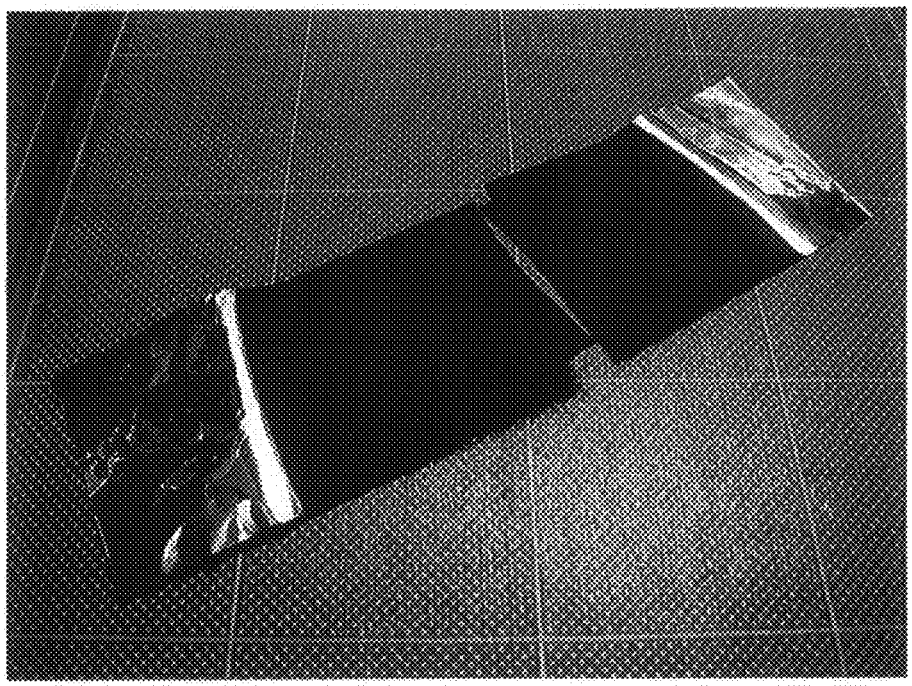
Figure 2:
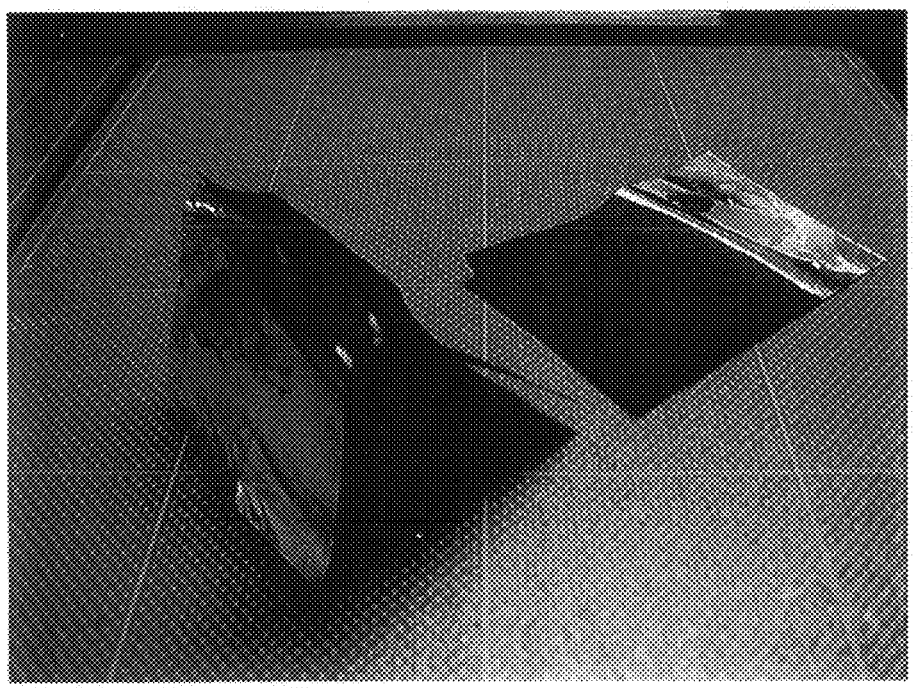
Figure 3:
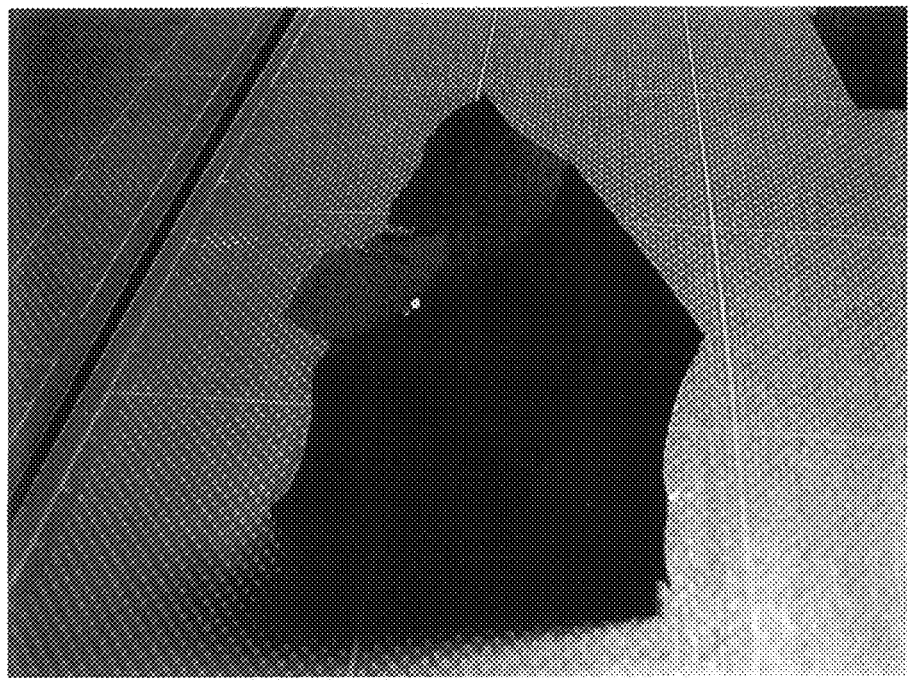
Figure 4:
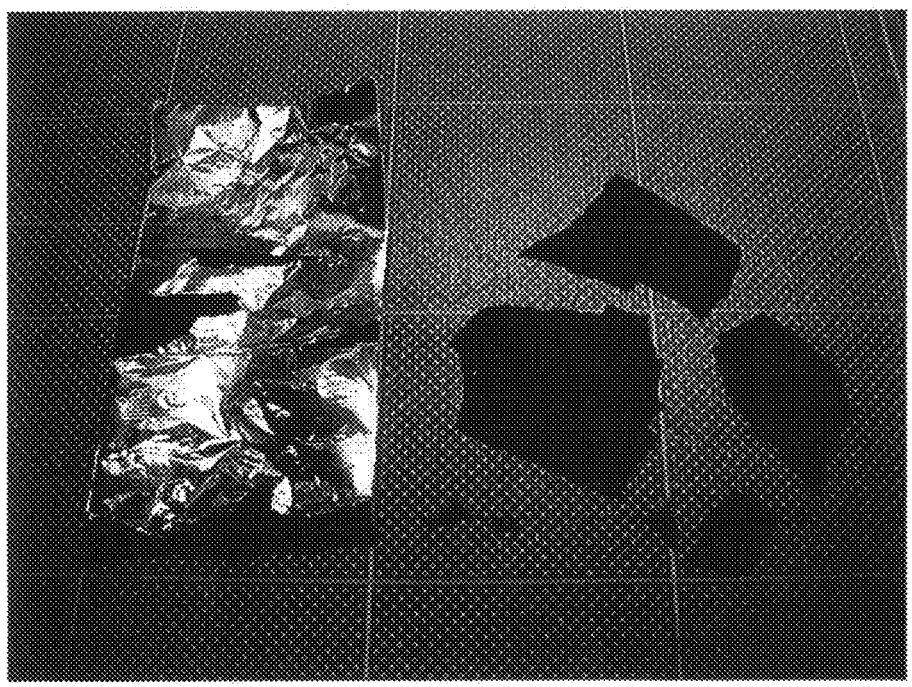
Figure 5A:
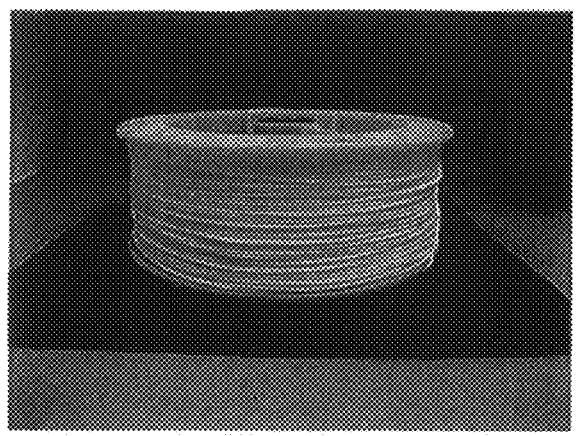
Figure 5B:
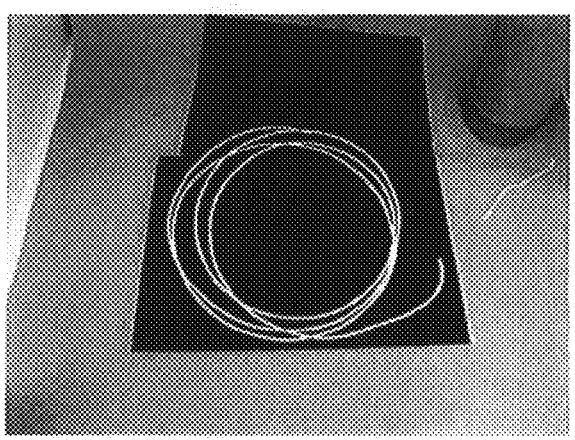
Figure 5C:
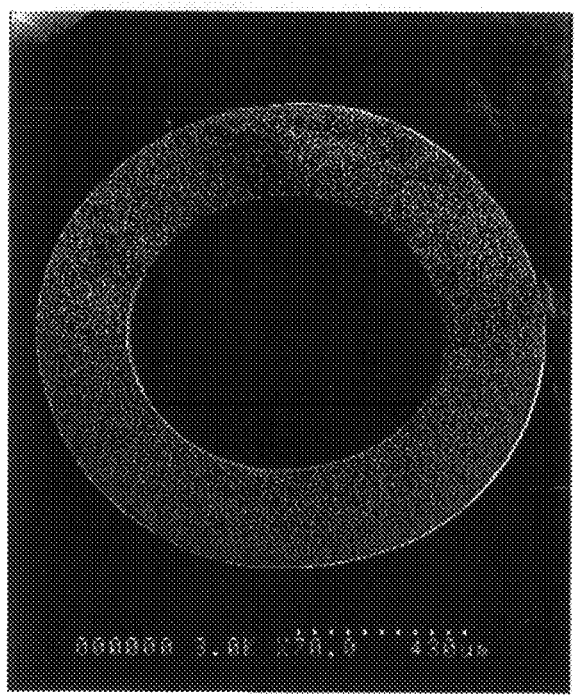
Figure 6A:
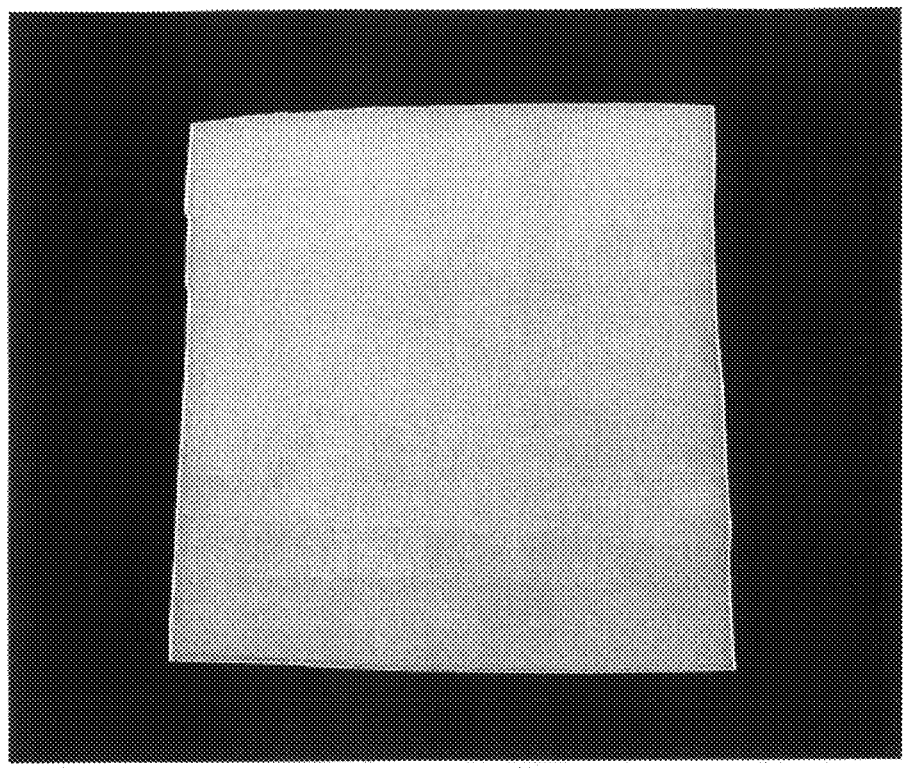
Figure 6B:
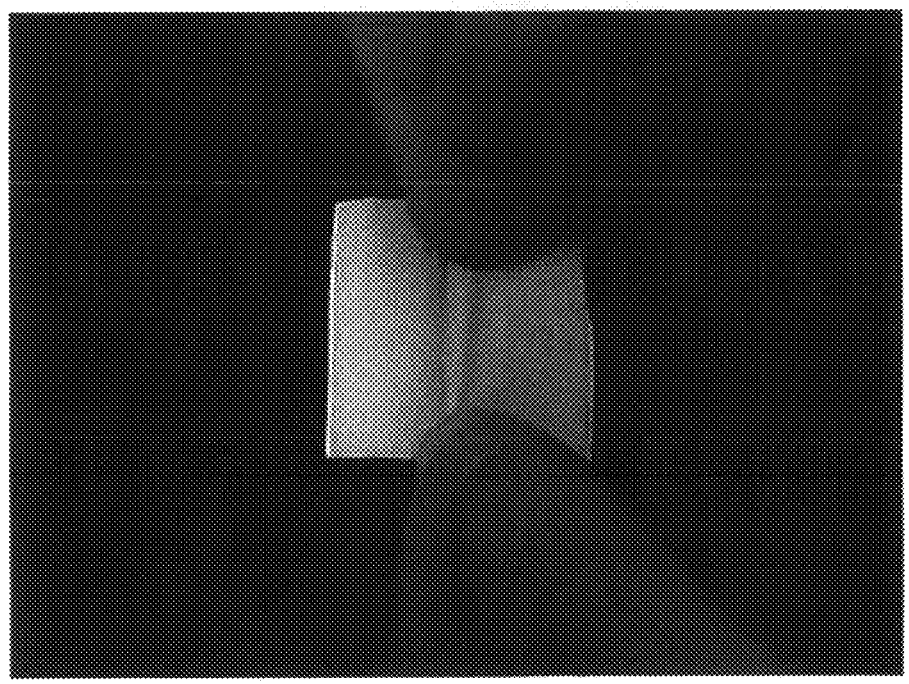

The present invention relates to a porous film or membrane of vinylidene fluoride resin excellent in hydrophilicity and having a good balance among strength, elongation and water permeation rate, and a process for producing thereof.

BACKGROUND ART

Hitherto, porous membranes of vinylidene fluoride resin excellent in weatherability, chemical resistance, heat resistance, strength, etc., have been used as microfiltration membranes for drugs, bacteria, etc., or as separators of batteries.

For the production of such porous membranes of vinylidene fluoride resin, there have been proposed, e.g., a process of mixing a vinylidene fluoride resin with an organic liquid such as diethyl phthalate and hydrophobic silica as an inorganic powder, melt-forming the mixture, and then extracting the organic liquid and silica (JP-A 3-215535), a process of forming a vinylidene fluoride resin into a porous membrane through crystallization, heat treatment, stretching and heat treatment under tension, under respectively controlled conditions (JP-A 54-62273), a process of forming a film of vinylidene fluoride resin of a specific molecular weight together with a plasticizer, cooling the film from one side thereof and then extracting the plasticizer (JP-A 7-13323), and a process of mixing a vinylidene fluoride resin of an ordinary molecular weight with a high-molecular weight vinylidene fluoride resin for increasing the heat distortion resistance and an organic pore-forming agent or an inorganic pore-forming agent to form a film, and then extracting the pore-forming agent for removal or using the inorganic pore-forming agent as nuclei of stress concentration at the time of stretching to form pores in the film, thereby forming a porous membrane (JP-A 2000-309672).

The thus-formed porous membrane of vinylidene fluoride resin is excellent in weatherability, chemical resistance, heat resistance, strength, etc., as mentioned above, but when it is used as a water-treating membrane for cleaning, it is required to prevent the soiling (fouling) with an organic matter such as protein, thereby preventing a lowering in water permeation rate for a long period. For this purpose, it has been proposed to hydophilize the porous membrane of vinylidene fluoride resin. More specifically, for the hyophilization, there have been proposed a method of coating the surface of a hollow fiber membrane with ethylene-vinyl alcohol copolymer (JP-A 2002-233739) and a method of forming a polyvinylpyrrolidone crosslinked product on a wet membrane (JP-A 11-302438).

However, such prior art methods are accompanied with difficulties, such as (1) coating or crosslinking operation is required to increase the number of steps, (2) as a result of the coating or crosslinked product, the original pore structure is changed, thereby making it difficult to control the water permeability, and the initial water permeation rate is remarkably lowered due to the treatment, and (3) it becomes difficult to take advantage of chemical resistances, such as anti-ozone and anti-chlorine properties, which are inherently owned by the vinylidene fluoride resin.

DISCLOSURE OF INVENTION

A principal object of the present invention is to provide a porous membrane of vinylidene fluoride resin which has been improved in hydrophilicity without causing the above-mentioned difficulties (1)-(3), etc., of the prior art, and also increased in initial water permeation rate.

A further object of the present invention is to provide a porous membrane of vinylidene fluoride resin which has been also improved in strength and elongation and is therefore provided with a good balance among strength, elongation and water permeation rate.

As a result of our study for accomplishing the above objects, it has been found very effective to use as the starting vinylidene fluoride resin a vinylidene fluoride copolymer having at least one species of hydrophilic group selected from epoxy group, hydroxy group, carboxy group, ester group, amide group and acid anhydride group.

More specifically, the porous membrane of vinylidene fluoride resin according to the present invention is characterized by comprising: a copolymer of 100 mols of a vinylidene fluoride monomer and 0.01-10.0 mols of a hydrophilic monomer having at least one species of hydrophilic group selected from epoxy group, hydroxy group, carboxy group, ester group, amide group and acid anhydride group.

As a result of the hydrophilization treatment, the porous membrane of vinylidene fluoride resin according to the present invention is characterized not only by an improvement in water permeability even from the initial stage but also by improved strength and elongation. This is presumably because as a result of copolymerization with a small amount of hydrophilic monomer, the growth of spherulite under the film-forming conditions through melting and cooling is suppressed, and this leads to the improvement in mechanical properties, such as strength and elongation of the porous membrane as the final product.

BEST MODE FOR PRACTICING THE INVENTION

Hereinbelow, some preferred embodiments of the present invention will be described in order.

<Vinylidene Fluoride Copolymer>

The vinylidene fluoride copolymer forming the porous membrane of vinylidene fluoride resin according to the present invention is a copolymer of 100 mols of a vinylidene fluoride monomer and 0.01-10.0 mols of a hydrophilic monomer having at least one species selected from epoxy group, hydroxy group, carboxy group, ester group, amide group and acid anhydride group. If the hydrophilic monomer is less than 0.01 mol per 100 mol of a vinylidene fluoride monomer, the effect of forming a hydrophilic copolymer is scarce compared with vinylidene fluoride homopolymer. In excess of 10.0 mol, the time for copolymerization with the vinylidene fluoride monomer becomes long to result in a remarkably inferior productivity, and also the resultant vinylidene fluoride copolymer is caused to lose the intrinsic properties of the vinylidene fluoride resin, such as weatherability, chemical resistance and heat resistance. The copolymerization ratio of the hydrophilic monomer is more preferably 0.05-7 mols, further preferably 0.1-5 mols. This amount is determined as a total amount in the case where two or more species of hydrophilic monomers are used in combination.

(Vinylidene Fluoride Monomer)

The vinylidene fluoride monomer referred to herein can include, in addition to vinylidene fluoride, at least one conventionally used monomers copolymerizable with vinylidene fluoride, such as vinyl fluoride, trifluoroethylene, trifluorochloroethylene, tetrafluoroethylene, hexafluoropropylene, and fluoroalkyl vinyl ether. However, it is preferred that the amount of vinylidene fluoride in the vinylidene fluoride monomer is at least 70 mol %, so as not to impair the excellent properties of vinylidene fluoride resin, such as chemical resistance, weatherability, and heat resistance.

(Hydrophilic Monomer)

The hydrophilic monomer usable in the present invention may comprise:

at least one epoxy group-containing vinyl monomer selected from the group-containing vinyl monomer selected from the group consisting of glycidyl (meth)acrylate, 2-methylglycidyl (meth)acrylate, 2-ethylglycidyl (meth)acrylate and 1-methylglycidyl (meth)acrylate, and glycidyl allyl ether (wherein, the expression of "(meth)acrylate" is used to mean at least one of acrylate and methacrylate);

at least one hydroxy group-containing vinyl monomer selected from the group consisting of hydroxyethyl methacrylate and hydroxyethyl acrylate;

at least one carboxy group-containing vinyl monomer selected from the group consisting of monomethyl maleate, monoethyl maleate, monomethyl citraconate, monoethyl citraconate, acrylic acid, methacrylic acid and β-methacryloyloxyethyl hydrogen succinate;

at least one ester group-containing vinyl monomer selected from the group consisting of vinyl acetate, 2-(N,N-diethylamino)ethyl acrylate, 2-(N,N-dimethylamino)ethyl methacrylate, 2-(N,N-diethylamino)ethyl methacrylate, vinylene carbonate and vinyl propionate;

at least one amide group-containing vinyl monomer selected from the group consisting of diacetone-acrylamide, methacrylamide, N-(3-dimethylaminopropyl)-acrylamide, N-(3-dimethylaminopropyl)-methacrylamide, N,N-dimethyl-acrylamide, N-isopropyl-acrylamide, and N,N-diethyl-acrylamide;

at least one acid anhydride group-containing vinyl monomer selected from the group consisting of maleic anhydride and citraconic anhydride; or a mixture of the above.

(Physical Properties)

The vinylidene fluoride copolymer may preferably have a melting point (referring to a maximum heat absorption peak temperature accompanying crystal melting by DSC (differential scanning calorimetry) at a temperature-raising rate of 10° C./min. in a nitrogen atmosphere) of 150-180° C. If the melting point is below 150° C., the resultant porous membrane is liable to have inferior heat-distortion resistance. In excess of 180° C., the melt-formability is lowered so that a uniform film formation thereof is liable to become difficult.

It is also preferred that the vinylidene fluoride copolymer has an inherent viscosity (referring to a logarithmic viscosity at 30° C. of a solution of 4 g of the resin in N,N-dimethylformamide and corresponding to an average molecular weight) of 0.5-5 dl/g. The meanings of the upper and the lower limits are similar to those with respect to the melting point.

(Polymerization)

The vinylidene fluoride copolymer used in the present invention can be produced through an arbitrary polymerization process, whereas such a vinylidene fluoride copolymer having a high vinylidene fluoride content and also a high melting point and a high molecular weight may preferably be produced through emulsion polymerization or suspension polymerization, particularly preferably through suspension polymerization.

<Production of Porous Membrane of Vinylidene Fluoride Resin>

The porous membrane of vinylidene fluoride resin according to the present invention can also be produced through conventional processes as described in, e.g., JP-A 3-215535, JP-A 54-62273, and JP-A 7-13323 mentioned hereinbefore.

However, in order to produce a porous membrane which is excellent in mechanical properties, such as tensile strength and elongation at break, and also has a narrow pore diameter distribution, it is preferred to produce the porous membrane through a process for producing a porous membrane of vinylidene fluoride resin according to the present invention, wherein 100 wt. parts of a vinylidene fluoride resin including a copolymer of 100 mols of a vinylidene fluoride monomer and 0.01-10.0 mols of a hydrophilic monomer having at least one species selected from epoxy group, hydroxy group, carboxy group, ester group, amide group and acid anhydride group, is mixed with 70-250 wt. parts of a plasticizer and 5-80 wt. parts of a good solvent for the copolymer to provide a composition; the composition is melt-extruded into a film; the film is cooled preferentially from one side thereof to be solidified; and the film is subjected to extraction of the plasticizer and further to stretching. Hereinbelow, the production process is described in order.

According to the present invention, a plasticizer and a good solvent for vinylidene fluoride copolymer are added to the above-mentioned vinylidene fluoride copolymer to form a starting composition for formation of the membrane.

(Plasticizer)

As the plasticizer, aliphatic polyesters of a dibasic acid and glycol may generally be used. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; and azelaic acid-based polyesters of e.g., the azelaic acid-propylene glycol type, and azelaic acid-1,3-butylene glycol type.

(Good Solvent)

As the good solvent for vinylidene fluoride copolymer, those capable of dissolving vinylidene fluoride copolymer in a temperature range of 20-250° C. may be used. Examples thereof may include: N-methylpyrrolidone, dimethylformamide, dimethylacetamide, dimethyl sulfoxide, methyl ethyl ketone, acetone, tetrahydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

(Composition)

The starting composition for formation of the membrane may preferably be obtained by mixing 70-250 wt. parts of the plasticizer and 5-80 wt. parts of the good solvent with 100 wt. parts of vinylidene fluoride resin including the vinylidene fluoride copolymer.

The vinylidene fluoride resin may preferably consist of the above-mentioned vinylidene fluoride copolymer alone but, according to necessity, can further comprise another thermoplastic resin thermally miscible with the vinylidene fluoride copolymer, particularly a (co-)polymer of one or more species of the above-mentioned vinylidene fluoride monomer, in mixture with the vinylidene fluoride copolymer. Also in this case, however, it is preferred that the vinylidene fluoride resin contains at least 0.01 wt. %, more preferably at least 0.05 wt. %, of polymerized units of the hydrophilic monomer, and at least 70 wt. % of polymerized units of vinylidene fluoride.

Below 70 wt. parts of the plasticizer with respect to 100 wt. parts of the vinylidene fluoride resin, the resultant membrane is liable to have a lower porosity, thus resulting in a battery separator exhibiting poor impregnatability with an electrolytic solution or an increased electric resistance, or a microfiltration membrane exhibiting a poor filtration performance (water permeation rate). On the other hand, above 250 wt.

parts, the resultant membrane is liable to have an excessively high porosity and a lower mechanical strength.

Below 5 wt. parts of the good solvent with respect to 100 wt. parts of the vinylidene fluoride resin, the uniform mixing of the vinylidene fluoride resin and the plasticizer is liable to be failed or require a long time. On the other hand, above 80 wt. parts, a high porosity cannot be attained corresponding to the amount of the plasticizer. In other words, an effective pore formation due to the extraction of the plasticizer is obstructed.

The total amount of the plasticizer and the good solvent may preferably be in the range of 100-250 wt. parts. These are both effective for reducing the viscosity of the melt-extruded composition and can function substitutively for each other to some extent. Among them, the good solvent should preferably occupy 5-30 wt. %.

(Mixing and Melt-Extrusion)

The melt-extrusion composition may be extruded into a film by extrusion through an annular nozzle or a T-die at a temperature of 140-270° C., preferably 150-230° C. Accordingly, the manners of mixing and melting of the vinylidene fluoride resin, plasticizer and good solvent are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of the first and second vinylidene fluoride resins) is supplied from an upstream side of the extruder and a mixture of the plasticizer and the good solvent is supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough.

(Cooling)

In the process of the present invention, the melt-extruded film product is cooled and solidified from one surface side. As for a flat sheet product extruded through a T-die, the cooling may be performed by causing the sheet to contact a surface temperature-controlled cooling drum or roller, and as for a hollow fiber film extruded through a nozzle, the cooling may be effected by causing the film to path through a cooling medium, such as water. The temperature of the cooling drum etc. or cooling medium can be selected from a broad temperature range but may preferably be in a range of 10-100° C., particularly preferably 30-80° C.

(Extraction)

The cooled and solidified film product is then introduced into an extraction liquid bath to remove the plasticizer and the good solvent therefrom. The extraction liquid is not particularly restricted provided that it does not dissolve the vinylidene fluoride resin while dissolving the plasticizer and the good solvent. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

(Heat Treatment)

The film or membrane product after the extraction may preferably be heat treated at a temperature in a range of 80-160° C., preferably 100-140° C., for 1-3600 sec., preferably 3-900 sec. to increase its crystallinity for the purpose of providing an improved processability for subsequent stretching.

(Stretching)

The film or membrane product after the extraction is then subjected to stretching for increasing the porosity and pore size and improving the strength and elongation. The stretching can be effected as biaxial stretching, e.g., by tentering, but may generally preferably be effected as uniaxial stretching in the longitudinal direction of the film or membrane product as by a pair of rollers rotating at different peripheral speeds. This is because it has been found that a microscopic texture including a stretched fibril portion and a non-stretched node portion appearing alternately in the stretched direction is preferred for the porous membrane of vinylidene fluoride resin of the present invention to exhibit a harmony of porosity and strength-elongation thereof. The stretching ratio may appropriately be 1.2-4.0 times, particularly ca. 1.4-3.0 times.

Through the above-mentioned steps, a porous membrane of vinylidene fluoride resin according to the present invention is obtained, but it is preferred to further treat the porous membrane with a basic solution. This is because owing to the basic solution treatment, the hydrophilicity of the vinylidene fluoride copolymer is further increased to improve the water permeation rate of the porous membrane. More specifically, the vinylidene fluoride copolymer of the present invention has at least one of hydroxy group —OH, carboxy group —COOH, and epoxy group —C(O)C—, and if they are treated with a basic solution, they are changed into their ionic form —O— or —O$^-$M$^+$ or ionic form —COO$^-$ or —COO$^-$ M$^+$ (wherein M$^+$ denotes a counter cation) to exhibit a larger hydrophilicity, thus causing an increase in water permeation rate of the resultant porous membrane. The basic solution may preferably be one exhibiting a pH of at least 12 in the form of, e.g., aqueous solutions or alcoholic solutions of inorganic alkaline (earth) metal hydroxides, such as sodium hydroxide, potassium hydroxide and calcium hydroxide, or corresponding alcoates, ammonia water, and organic amines, such as methylamine and dimethylamine.

(Porous Membrane of Vinylidene Fluoride Resin)

The porous membrane of vinylidene fluoride resin of the present invention obtained as described above may be generally provided with properties, inclusive of a porosity of 55-90%, preferably 60-85%, particularly preferably 65-80%; a tensile strength of at least 5 MPa, an elongation at break of at least 5%, and when used as a water-filtering membrane, a water permeation rate of at least 5 m$^3$/m$^2$·day at 100 kPa. The thickness is ordinarily in the range of 5-800 μm, preferably 50-600 μm, particularly preferably 150-500 μm. In the case of a hollow fiber form, the outer diameter may suitably be on the order of 0.3-3 mm, particularly ca. 1-3 mm.

Further, a micro-texture characteristic of the porous membrane of vinylidene fluoride resin produced through the above-mentioned process according to the present invention is that it comprises a crystalline oriented portion and a crystalline non-oriented portion (random oriented portion) recognizable by X-ray diffraction, which are understood as corresponding to a stretched fibril portion and a non-stretched node portion, respectively.

(X-Ray Diffraction Method)

More specifically, the X-ray diffraction characteristics of film or membrane materials described herein are based on measured results according to the following method. (Refer to the specification of PCT/JP2004/003074 if further details are desired.)

If the film is in the form of a hollow fiber, the yarn was split into halves along a longitudinal direction thereof, and a film sample is attached to a sample stand so that its longitudinal direction is oriented vertically. Then, X-rays are incident in a direction perpendicular to the longitudinal direction. The X-ray generator may be "ROTAFLEX 200RB" made by Rigaku Denki K.K., and CuKα rays at 30 kV-100 mA and having passed through an Ni filter may be used as an X-ray source. An imaging plate ("BAS-SR127" made by Fuji Shashin Film K.K.) may be used to photograph a diffraction image at a sample-imaging plate distance of 60 mm.

As a result, the presence in mixture of the crystal oriented portion and the crystal non-oriented portion in the porous membrane of the present invention can be quantitatively represented by X-ray diffraction parameters including a diffraction intensity ratio on the meridian of at least 1.1, preferably at least 1.2, between those at diffraction angles $2\theta=20.1\pm1°$ and $2\theta=23.0\pm1°$, and an azimuth intensity distribution curve at $2\theta=20.1\pm1°$ showing a peak having a half-value width of at most 80° preferably at most 60°.

EXAMPLES

Hereinbelow, the present invention will be described more specifically based on Examples and Comparative Examples. The properties other than the above-mentioned X-ray diffraction characteristics described herein including those described below are based on measured values according to the following methods.

(Inherent Viscosity)

Measured as a logarithmic viscosity at 30° C. of a solution at a resin concentration of 4 g in one liter of N,N-dimethylformamide.

(Melting Point)

5 mg of a vinylidene fluoride resin sample was loaded on an aluminum-made pan and subjected to differential scanning calorimetry by using "TC 10A Model TA Processor" made by Mettler Instrumente A.G. at a rate of 10° C./min. An endotherm peak temperature in a second heating was taken as a melting point (Tm).

(Contact Angle)

Sheets of a vinylidene fluoride resin sample formed by hot pressing at 230° C. were immersed for 1.5 hours in 5 wt. % and 1 wt. % aqueous solutions of sodium hydroxide (NaOH) at 70° C. and then washed with water to provide samples, which were then subjected to contact-angle measurement by using "FACECONTACT-ANGLE-METER CA-D" made by KYOWA Kaimen Kagaku K.K.

(Porosity)

The length and also the width and thickness (or outer diameter and inner diameter in the case of a hollow fiber) of a sample porous membrane were measured to calculate an apparent volume V (cm$^3$) of the porous membrane, and the weight W (g) of the porous membrane was measured to calculate a porosity according to the following formula:

Porosity (%)=$(1-W/(V\times\rho))\times100$, wherein ρ: density of PVDF (=1.78 g/cm$^3$)

(Water Permeation Rate (Flux))

A sample porous membrane was immersed in ethanol for 15 min., then immersed in water to be hydrophilized, and then subjected to a measurement at a water temperature of 25° C. and a pressure difference of 100 kPa. In the case of a hollow fiber-form porous membrane, the area of the membrane was calculated based on the outer diameter according to the following formula:

Membrane area (m$^2$)=(outer diameter)$\times\pi\times$(length).

(Tensile Strength and Elongation at Break)

Measured by using a tensile tester ("RTM-100", made by Toyo Baldwin K.K.) under the conditions of an initial sample length of 100 mm and a tensile speed of 200 mm/min. in an environment of a temperature of 23° C. and a relative humidity of 50%.

Example 1

VDF/HEMA=100/1 (by Weight)

Into an autoclave of 2 liter (inner volume), 1036 g of deionized water, 0.6 g of methyl cellulose, 1.2 g of ethyl acetate, 3.2 g of diisopropyl peroxy-dicarbonate (IPP), 400 g of vinylidene fluoride and 4 g of hydroxyethyl methacrylate (mol ratio=100:0.49), were charged and subjected to suspension polymerization for 30 hours at 29° C. After completion of the polymerization, the polymer slurry was dewatered, washed with water and dewatered, and then dried at 80° C. for 20 hours to obtain Polymer powder (1). Polymer powder (1) was produced at a yield of 90 wt. %, and exhibited an inherent viscosity of 1.47 dl/g and a melting point of 174° C.

37.5 wt. % of Polymer powder (1), 7.8 wt. % of N-methyl-2-pyrrolidone and 54.7 wt. % of adipic acid-based polyester plasticizer ("PN-150", made by Asahi Denka Kogyo K.K.) were melt-kneaded through a 30 mm-dia. twin-screw extruder, spun through a hollow fiber nozzle and melt-extruded via air at a rate of 5 m/min. into a water bath at 12° C. to form a hollow fiber, which was then wound up. The thus-wound hollow fiber was immersed twice for 30 min. each while being vibrated in methylene chloride at room temperature to extract the NMP and PN-150, followed by stretching at room temperature, heat-treating and drying at 120° C., thereby obtaining a porous hollow fiber membrane of polyvinylidene fluoride resin having an outer diameter of 1.487 mm and an inner diameter of 0.721 mm.

Example 2-1

VDF/2M-GMA=100/0.5 (by Weight)

Into an autoclave of 2 liter (inner volume), 1036 g of deionized water, 0.6 g of methyl cellulose, 2.0 g of ethyl acetate, 3.2 g of diisopropyl peroxydicarbonate (IPP), 400 g of vinylidene fluoride and 2 g of 2-methylglycidyl methacrylate (mol ratio=100:0.20), were charged and subjected to suspension polymerization for 36 hours at 28° C. After completion of the polymerization, the polymer slurry was dewatered, washed with water and dewatered, and then dried at 80° C. for 20 hours to obtain Polymer powder (2-1). Polymer powder (2-1) was produced at a yield of 87 wt. %, and exhibited an inherent viscosity of 1.49 dl/g and a melting point of 174° C.

In the same manner as in Example 1 except for using Polymer powder (2-1), a porous hollow fiber membrane of polyvinylidene fluoride resin having an outer diameter of 1.467 mm and an inner diameter of 0.771 mm, was obtained.

Example 2-2

VDF/2M-GMA=100/1 (by Weight)

Into an autoclave of 2 liter (inner volume), 1036 g of deionized water, 0.6 g of methyl cellulose, 2.0 g of ethyl acetate, 3.2 g of diisopropyl peroxydicarbonate (IPP), 400 g of vinylidene fluoride and 4 g of 2-methylglycidyl methacrylate (mol ratio=100:0.41), were charged and subjected to suspension polymerization for 27 hours at 28° C. After completion of the polymerization, the polymer slurry was dewatered, washed with water and dewatered, and then dried at 80° C. for 20 hours to obtain Polymer powder (2-2). Polymer powder (2-2) was produced at a yield of 90 wt. %, and exhibited an inherent viscosity of 1.52 dl/g and a melting point of 174° C.

In the same manner as in Example 1 except for using Polymer powder (2-2), a porous hollow fiber membrane of polyvinylidene fluoride resin having an outer diameter of 1.526 mm and an inner diameter of 0.767 mm, was obtained.

Example 2-3

VDF/2M-GMA=100/5 (by Weight)

Into an autoclave of 2 liter (inner volume), 1036 g of deionized water, 0.6 g of methyl cellulose, 3.2 g of diisopropyl peroxydicarbonate (IPP), 400 g of vinylidene fluoride and 20 g of 2-methylglycidyl methacrylate (mol ratio=100:2.1), were charged and subjected to suspension polymerization for 26.5 hours at 28° C. After completion of the polymerization, the polymer slurry was dewatered, washed with water and dewatered, and then dried at 80° C. for 20 hours to obtain Polymer powder (2-3). Polymer powder (2-3) was produced at a yield of 90 wt. %, and exhibited an inherent viscosity of 1.84 dl/g and a melting point of 171° C.

In the same manner as in Example 1 except for using Polymer powder (2-3), a porous hollow fiber membrane of polyvinylidene fluoride resin having an outer diameter of 1.621 mm and an inner diameter of 0.776 mm, was obtained.

Example 3-1

VDF/GMA=100/1 (by Weight)

Into an autoclave of 2 liter (inner volume), 1036 g of deionized water, 0.6 g of methyl cellulose, 3.2 g of diisopropyl peroxydicarbonate (IPP), 400 g of vinylidene fluoride and 4 g of glycidyl methacrylate (mol ratio=100:0.45), were charged and subjected to suspension polymerization for 26 hours at 28° C. After completion of the polymerization, the polymer slurry was dewatered, washed with water and dewatered, and then dried at 80° C. for 20 hours to obtain Polymer powder (3-1). Polymer powder (3-1) was produced at a yield of 90 wt. %, and exhibited an inherent viscosity of 1.79 dl/g and a melting point of 174° C.

In the same manner as in Example 1 except for using Polymer powder (3-1), a porous hollow fiber membrane of polyvinylidene fluoride resin having an outer diameter of 1.489 mm and an inner diameter of 0.795 mm, was obtained.

Example 3-2

VDF/GMA=100/3 (by Weight)

Into an autoclave of 2 liter (inner volume), 1036 g of deionized water, 0.6 g of methyl cellulose, 3.2 g of diisopropyl peroxydicarbonate (IPP), 400 g of vinylidene fluoride and 12 g of glycidyl methacrylate (mol ratio=100:1.35), were charged and subjected to suspension polymerization for 32 hours at 28° C. After completion of the polymerization, the polymer slurry was dewatered, washed with water and dewatered, and then dried at 80° C. for 20 hours to obtain Polymer powder (3-2). Polymer powder (3-2) was produced at a yield of 93 wt. %, and exhibited an inherent viscosity of 1.77 dl/g and a melting point of 173° C.

In the same manner as in Example 1 except for using Polymer powder (3-2), a porous hollow fiber membrane of polyvinylidene fluoride resin having an outer diameter of 1.503 mm and an inner diameter of 0.743 mm, was obtained.

Example 4

VDF/MAA/HEMA=100/1/0.5 (by Weight)

Into an autoclave of 2 liter (inner volume), 1036 g of deionized water, 0.6 g of methyl cellulose, 3.2 g of diisopropyl peroxydicarbonate (IPP), 400 g of vinylidene fluoride, 4 g of methacrylic acid and 2 g of hydroxyethyl methacrylate (mol ratio=100:0.74:0.25), were charged and subjected to suspension polymerization for 23 hours at 28° C. After completion of the polymerization, the polymer slurry was dewatered, washed with water and dewatered, and then dried at 80° C. for 20 hours to obtain Polymer powder (4). Polymer powder (4) was produced at a yield of 95 wt. %, and exhibited an inherent viscosity of 1.88 dl/g and a melting point of 173° C.

In the same manner as in Example 1 except for using Polymer powder (4), a porous hollow fiber membrane of polyvinylidene fluoride resin having an outer diameter of 1.417 mm and an inner diameter of 0.707 mm, was obtained.

Example 5

VDF/CTFE/HFP/2M–GMA=96.5/2/1.5/1 (by Weight)

Into an autoclave of 2 liter (inner volume), 1036 g of deionized water, 0.6 g of methyl cellulose, 0.88 g of diisopropyl peroxydicarbonate (IPP), 386 g of vinylidene fluoride, 8 g of chlorotrifluoroethylene, 6 g of hexafluoro-propylene and 4 g of 2-methylglycidyl methacrylate (mol ratio=98.2:1.1:0.7:0.41), were charged and subjected to suspension polymerization for 52 hours at 28° C. After completion of the polymerization, the polymer slurry was dewatered, washed with water and dewatered, and then dried at 80° C. for 20 hours to obtain Polymer powder (5). Polymer powder (5) was produced at a yield of 90 wt. %, and exhibited an inherent viscosity of 3.43 dl/g and a melting point of 163° C.

In the same manner as in Example 1 except for using Polymer powder (5), a porous hollow fiber membrane of polyvinylidene fluoride resin having an outer diameter of 1.683 mm and an inner diameter of 0.786 mm, was obtained.

Example 6

VDF/MMM=100/1 (by Weight)

Into an autoclave of 2 liter (inner volume), 1040 g of deionized water, 0.8 g of methyl cellulose, 2.5 g of ethyl acetate, 4 g of diisopropyl peroxydicarbonate, 396 g of vinylidene fluoride and 4.0 g of monomethyl maleate (mol ratio=100:0.50), were charged and subjected to suspension polymerization for 47 hours at 28° C. After completion of the polymerization, the polymer slurry was dewatered, washed with water and dewatered, and then dried at 80° C. for 20 hours to obtain Polymer powder (6). Polymer powder (6) was produced at a yield of 80 wt. %, and exhibited an inherent viscosity of 1.13 dl/g and a melting point of 169° C.

In the same manner as in Example 1 except for using Polymer powder (6), a porous hollow fiber membrane of polyvinylidene fluoride resin having an outer diameter of 1.526 mm and an inner diameter of 0.801 mm, was obtained.

Example 7

VDF/VAc=100/3 (by Weight)

Into an autoclave of 2 liter (inner volume), 1036 g of deionized water, 0.2 g of methyl cellulose, 6.4 g of dinormal propyl peroxydicarbonate (NPP), 400 g of vinylidene fluoride and 12 g of vinyl acetate (mol ratio=100:2.23), were charged and subjected to suspension polymerization for 31 hours at 28° C. After completion of the polymerization, the polymer slurry was dewatered, washed with water and dewatered, and then dried at 80° C. for 20 hours to obtain Polymer powder (7). Polymer powder (7) was produced at a yield of 87 wt. %, and exhibited an inherent viscosity of 0.97 dl/g.

In the same manner as in Example 1 except for using Polymer powder (7), a porous hollow fiber membrane of polyvinylidene fluoride resin having an outer diameter of 1.50 mm and an inner diameter of 0.90 mm, was obtained.

Example 8

VDF/DAAAm=100/1 (by Weight)

Into an autoclave of 2 liter (inner volume), 1036 g of deionized water, 0.2 g of methyl cellulose, 6.4 g of dinormal-propyl peroxydicarbonate, 400 g of vinylidene fluoride and 4 g diacetone acrylamide (DAAAm) (mol ratio=100:0.38) dissolved in 40 g of water, were charged and subjected to suspension polymerization for 28 hours at 28° C. After completion of the polymerization, the polymer slurry was dewatered, washed with water and dewatered, and then dried at 80° C. for 20 hours to obtain Polymer powder (8). Polymer powder (8) was produced at a yield of 85 wt. %, and exhibited an inherent viscosity of 1.12 dl/g.

In the same manner as in Example 1 except for using Polymer powder (8), a porous hollow fiber membrane of polyvinylidene fluoride resin having an outer diameter of 1.49 mm and an inner diameter of 0.89 mm, was obtained.

Example 9

VDF/VC=100/1 (by Weight)

Into an autoclave of 2 liter (inner volume), 1036 g of deionized water, 0.2 g of methyl cellulose, 6.4 g of dinormal-propyl peroxydicarbonate, 400 g of vinylidene fluoride and 4 g of vinylene carbonate (mol ratio=100:0.74), were charged and subjected to suspension polymerization for 22.5 hours at 28° C. After completion of the polymerization, the polymer slurry was dewatered, washed with water and dewatered, and then dried at 80° C. for 20 hours to obtain Polymer powder (9). Polymer powder (9) was produced at a yield of 83 wt. %, and exhibited an inherent viscosity of 1.10 dl/g.

In the same manner as in Example 1 except for using Polymer powder (9), a porous hollow fiber membrane of polyvinylidene fluoride resin having an outer diameter of 1.48 mm and an inner diameter of 0.88 mm, was obtained.

Example 10

VDF/Citraconic Anhydride=100/1 (by Weight)

Into an autoclave of 2 liter (inner volume), 1036 g of deionized water, 0.4 g of methyl cellulose, 2 g of diisopropyl peroxydicarbonate (IPP), 400 g of vinylidene fluoride and 4 g of citraconic anhydride (mol ratio=100:0.49), were charged and subjected to suspension polymerization for 62.5 hours at 40° C. After completion of the polymerization, the polymer slurry was dewatered, washed with water and dewatered, and then dried at 80° C. for 20 hours to obtain Polymer powder (10). Polymer powder (10) was produced at a yield of 79 wt. %, and exhibited an inherent viscosity of 0.78 dl/g.

In the same manner as in Example 1 except for using Polymer powder (10), a porous hollow fiber membrane of polyvinylidene fluoride resin having an outer diameter of 1.47 mm and an inner diameter of 0.87 mm, was obtained.

Comparative Example 1

VDF=100%

Into an autoclave of 2 liter (inner volume), 1024 g of deionized water, 0.2 g of methyl cellulose, 2.0 g of dinormal-propyl peroxydicarbonate, and 400 g of vinylidene fluoride, were charged and subjected to suspension polymerization for 13 hours at 26° C. After completion of the polymerization, the polymer slurry was dewatered, washed with water and dewatered, and then dried at 80° C. for 20 hours to obtain Polymer powder (11). Polymer powder (11) was produced at a yield of 94 wt. %, and exhibited an inherent viscosity of 1.70 dl/g and a melting point of 175° C.

In the same manner as in Example 1 except for using Polymer powder (11), a porous hollow fiber membrane of polyvinylidene fluoride resin having an outer diameter of 1.468 mm and an inner diameter of 0.736 mm, was obtained.

Inclusively shown in the following table are the compositions, melting points, inherent viscosities ($\eta$), and contact angles after treatment within 5 wt. % NaOH solution (pH14) and 1 wt. % NaOH solution (pH13) of the vinylidene fluoride resins used in the above Examples and Comparative Examples. In the table, the comonomers providing the vinylidene fluoride resins through the (co-)polymerization are represented by the following abbreviations:

VDF: vinylidene fluoride,
HEMA: hydroxyethyl methacrylate,
2-MGMA: 2-methylglycidyl methacrylate,
GMA: glycidyl methacrylate,
MAA: methacrylic acid,
CTFE: chlorotrifluoroethylene,
HFP: hexafluoropropylene,
MMM: monomethyl maleate,
VAc: vinyl acetate,
DAAAm: diacetone acrylamide,
VC: vinylene carbonate.

TABLE 1

| | | Contact angle (°) | |
|---|---|---|---|
| | Vinylidene fluoride resin | treated with 5 wt. % NaOH | treated with 1 wt. % NaOH |
| Example 1 | VDF/HEMA = 100/1(wt.), m.p.: 174° C., $\eta$1.47 | 61 | 64 |
| Example 2-1 | VDF/2M-GMA = 100/0.5(wt.), m.p.: 174° C., $\eta$1.49 | 67 | — |
| Example 2-2 | VDF/2M-GMA = 100/1(wt.), m.p.: 174° C., $\eta$1.52 | 64 | — |
| Example 2-3 | VDF/2M-GMA = 100/5(wt.), m.p.: 171° C., $\eta$1.84 | 56 | — |

TABLE 1-continued

|  | Vinylidene fluoride resin | Contact angle (°) | |
|---|---|---|---|
|  |  | treated with 5 wt. % NaOH | treated with 1 wt. % NaOH |
| Example 3-1 | VDF/GMA = 100/1(wt.), m.p.: 174° C., η1.79 | 58 | 60 |
| Example 3-2 | VDF/GMA = 100/3(wt.), m.p.: 173° C., η1.77 | 53 | — |
| Example 4 | VDF/MAA/HEMA = 100/1/0.5(wt.), m.p.: 173° C., η1.88 | 62 | — |
| Example 5 | VDF/CTFE/HFP/2M-GMA = 96.5/2/1.5/1(wt.), m.p.: 163° C., η3.43 | 57 | — |
| Example 6 | VDF/MMM = 100/1(wt.), m.p.: 169° C., η1.13 | 61 | — |
| Example 7 | VDF/VAc = 100/3(wt.), η0.97 | 52 | — |
| Example 8 | VDF/DAAAm = 100/1(wt.), η1.12 | 65 | — |
| Example 9 | VDF/VC = 100/1(wt.), η1.10 | 66 | — |
| Example 10 | VDF/citraconic anhydride = 100/0.1(wt.), η0.78 | 65 | — |
| Comparative Example 1 | VDF = 100(wt.), m.p.: 175° C., η1.70 | 78 | 80 |

Inclusively shown in the following Table 2 are the water permeation rates, tensile strengths, elongation at break, etc. measured for the hollow fibers prepared in the above Example 1, Example 3-1 and Comparative Example 1.

TABLE 2

|  |  | Example 1 | Example 3-1 | Comparative Example 1 |
|---|---|---|---|---|
| PVDF | Inherent viscosity (dl/g) | 1.47 | 1.79 | 1.70 |
|  | Weight-average molecular weight Mw(× $10^5$) | 4.23 | 5.02 | 4.92 |
|  | Mw/Mn | 2.23 | 2.30 | 2.13 |
| Forming aids | Polyester plasticizer | PN-150 | PN-150 | PN-150 |
|  | Solvent | NMP | NMP | NMP |
|  | Plasticizer/solvent mix ratio (wt. %) | 87.5/12.5 | 87.5/12.5 | 87.5/12.5 |
| PVDF/Forming aids ratio (wt. %) |  | 37.5/62.5 | 37.5/62.5 | 37.5/62.5 |
| Air gap (mm) |  | 40 | 20 | 40 |
| Water bath temp. (° C.) |  | 12 | 12 | 12 |
| Take-up speed (m/min.) |  | 5 | 5 | 5 |
| Stretching ratio (times) |  | 1.6 | 1.8 | 1.8 |
| Outer diameter (mm) |  | 1.487 | 1.489 | 1.468 |
| Inner diameter (mm) |  | 0.721 | 0.795 | 0.736 |
| Membrane thickness (mm) |  | 0.381 | 0.347 | 0.366 |
| Porosity (%) |  | 75 | 76.5 | 71 |
| Water permeation rate ($m^3/m^2 \cdot day$) |  | 9.11 | 7.17 | 1.82 |
| Tensile strength |  | 17.8 | 21.2 | 10.2 |
| Elongation at break |  | 123 | 178 | 10 |

Mn: number-average molecular weight.

Further inclusively shown in the following table 3 are the water permeation rates of the hollow fibers of Example 1, Example 3-1 and Comparative Example 1 after treatment within 5% NaOH aqueous solution at 70° C. for 1 hour and washing with water together with those before the treatment.

TABLE 3

| | Hollow fiber sample | | | | | |
|---|---|---|---|---|---|---|
| | Example 1 | | Example 3-1 | | Comparative Example 1 | |
| | 5% NaOH treatment | | | | | |
| | Before | After | Before | After | Before | After |
| Water permeation rate ($m^3/m^2 \cdot day$) | 9.11 | 19.14 | 7.17 | 15.73 | 1.82 | 3.57 |

INDUSTRIAL APPLICABILITY

As is understood from the results shown in Tables 2 and 3 above, the porous membrane obtained from the vinylidene fluoride copolymers having a hydrophilic group selected from epoxy group, hydroxy group, carboxy group, ester group, amide group and acid anhydride group of the present invention have been remarkably improved in water permeation rate, tensile strength and elongation at break, particularly further remarkably improved in water permeation rate by a basic solution treatment, compared with the porous membrane obtained from the vinylidene fluoride homopolymer.

The invention claimed is:

1. A porous membrane of vinylidene fluoride resin, consisting essentially of: a copolymer obtained by copolymerization of 100 mols of a vinylidene fluoride monomer and 0.01-10.0 mols of a hydrophilic monomer having at least one species of hydrophilic group selected from epoxy group, hydroxy group, carboxy group, ester group, amide group and acid anhydride group, wherein the porous membrane has a tensile strength of at least 5 MPa.

2. A porous membrane according to claim 1, wherein the hydrophilic monomer is at least one epoxy group-containing vinyl monomer selected from the group-containing vinyl monomer selected from the group consisting of glycidyl (meth)acrylate, 2-methylglycidyl (meth)acrylate, 2-ethylglycidyl (meth)acrylate and 1-methylglycidyl (meth)acrylate, and glycidyl allyl ether.

3. A porous membrane according to claim 1, wherein the hydrophilic monomer is at least one hydroxy group-containing vinyl monomer selected from the group consisting of hydroxyethyl methacrylate and hydroxyethyl acrylate.

4. A porous membrane according to claim 1, wherein the hydrophilic monomer is at least one carboxy group-containing vinyl monomer selected from the group consisting of monomethyl maleate, monoethyl maleate, monomethyl citraconate, monoethyl citraconate, acrylic acid, methacrylic acid and β-methacryloyloxyethyl hydrogen succinate.

5. A porous membrane according to claim 1, wherein the hydrophilic monomer is at least one ester group-containing vinyl monomer selected from the group consisting of vinyl acetate, 2-(N,N-diethylamino)ethyl acrylate, 2-(N,N-dimethylamino)ethyl methacrylate, 2-(N,N-diethylamino)ethyl methacrylate, vinylene carbonate and vinyl propionate.

6. A porous membrane according to claim 1, wherein the hydrophilic monomer is at least one amide group-containing vinyl monomer selected from the group consisting of diacetone-acrylamide, methacrylamide, N-(3-dimethylaminopropyl)-acrylamide, N-(3-dimethylaminopropyl)-methacrylamide, N,N-dimethyl-acrylamide, N-isopropyl-acrylamide, and N,N-diethyl-acrylamide.

7. A porous membrane according to claim 1, wherein the hydrophilic monomer is at least one acid anhydride group-containing vinyl monomer selected from the group consisting of maleic anhydride and citraconic anhydride.

8. A porous membrane according to claim 1, wherein the vinylidene fluoride copolymer has a melting point of 150-180° C.

9. A porous membrane according to claim 1, wherein the vinylidene fluoride copolymer has an inherent viscosity of 0.5-5 dl/g.

10. A porous membrane according to claim 1, which is in the form of a hollow fiber.

11. A porous membrane according to claim 1, which has been treated with a basic solution.

12. A process for producing a porous membrane of vinylidene fluoride resin according to claim 1 comprising: mixing 100 wt. parts of a vinylidene fluoride resin including a copolymer obtained by copolymerization of 100 mols of a vinylidene fluoride monomer and 0.01-10.0 mols of a hydrophilic monomer having at least one species of hydrophilic group selected from epoxy group, hydroxy group, carboxy group, ester group, amide group and acid anhydride group with 70-250 wt. parts of a plasticizer and 5-80 wt. parts of a good solvent for the copolymer to provide a composition; melt-extruding the composition into a film; cooling the film preferentially one side thereof to solidify the film; extracting the plasticizer; and further stretching the film, wherein the porous membrane has a tensile strength of at least 5 MPa.

* * * * *